United States Patent [19]

Brooks

[11] Patent Number: 4,640,944
[45] Date of Patent: Feb. 3, 1987

[54] INJECTION MOLDABLE POLYAMIDE-IMIDE-PHTHALAMIDE COPOLYMERS CONTAINING POLYETHERIMIDES

[75] Inventor: Gary T. Brooks, Naperville, Ill.

[73] Assignee: Standard Oil Company (Indiana), Chicago, Ill.

[21] Appl. No.: 759,421

[22] Filed: Jul. 26, 1985

Related U.S. Application Data

[63] Continuation of Ser. No. 576,137, Jan. 31, 1984, abandoned.

[51] Int. Cl.$^4$ .......................... C08K 9/00; C08L 77/06
[52] U.S. Cl. ..................................... 523/205; 523/209; 525/436
[58] Field of Search ................. 525/436; 523/209, 205

[56] References Cited

U.S. PATENT DOCUMENTS

| | | | |
|---|---|---|---|
| 3,573,266 | 3/1971 | Morello | 525/436 |
| 3,682,960 | 8/1972 | Haller | 525/436 |
| 4,258,155 | 3/1981 | Holub et al. | 525/436 |
| 4,309,528 | 1/1982 | Keske et al. | 528/188 |
| 4,313,868 | 2/1982 | Hanson | 528/188 |

*Primary Examiner*—John C. Bleutge
*Assistant Examiner*—A. L. Carrillo
*Attorney, Agent, or Firm*—Wallace L. Oliver; William T. McClain; William H. Magidson

[57] ABSTRACT

Novel polyamide-imide-phthalamide copolymers containing polyetherimides are disclosed. These copolymers are useful for the manufacture of thin films, molded objects and engineering resins.

20 Claims, No Drawings

INJECTION MOLDABLE POLYAMIDE-IMIDE-PHTHALAMIDE COPOLYMERS CONTAINING POLYETHERIMIDES

This is a continuation of application Ser. No. 576,137, filed Jan. 31, 1986, now abandoned.

BACKGROUND OF THE INVENTION

1. Field of the Invention

The field of this invention relates to polyamide-imide-phthalamide copolymers containing polyetherimides, to molding powders, molded articles and to films prepared therefrom.

Amide-imide polymers are a relatively new class of organic compounds known for their solubility in nitrogen-containing organic solvents when in the largely polyamide form. The major application of the amide-imide copolymers has been as wire enamels. This is illustrated in U.S. Pat. Nos. 3,661,832, (1972), 3,494,890 (1970) and 3,347,828 (1967).

Compositions prepared from isophthalic acid and diamines and aliphatic diamines have found application in coatings and films. The prior art on this is summarized in U.S. Pat. No. 3,444,183 (1969).

Reinforced polyhexamethylene isophthalamides have been used to produce articles as disclosed in U.S. Pat. No. 4,118,364 (1978). However, the physical properties of these reinforced polyhexamethylene isophthalamides are insufficient for use in engineering plastics, since their tensile strength and the continuous service temperature does not meet those required for engineering plastics.

Polyamide-imide-phthalamide copolymers are extremely rigid polymers which lack the inherent toughness needed to compete in those applications which require elevated temperature resistance and good impact strength. The lack of matrix toughness can cause problems when molding thick cross-sectional parts, especially with the filled copolymers, since the copolymer matrix is not strong or tough enough to resist the molding cool down stresses which can result in internal cracks. The art has been looking for improvements in the impact resistance and toughness of the polymer, but it is essential that the additive not impair the excellent curing characteristics of the PAI or its thermal and strength properties, particularly the heat deflection temperature and tensile strength.

The general object of this invention is to provide polyamide-imide-phthalamide copolymers containing polyetherimides. A more specific object of this invention is to provide polyamide-imide-phthalamide copolymers suitable for use as engineering plastics and particularly for use in injection molding wherein the physical properties of the copolymers are improved by the addition of about 0.1 to about 50 percent by weight of polyetherimides. Other objects appear hereinafter.

I have now found that amide-imide-phthalamide copolymers obtained in reacting a polycarboxylic acid anhydride and a dicarboxylic acid with primary diamines or a mixture of primary diamines, comprising about 0.1 to about 50 percent by weight of polyetherimide, have excellent physical properties and can readily be injection molded to provide engineering plastics with excellent properties. The polyetherimides improve the physical properties and reduce mold part cracking of neat or filled amide-imide-phthalamide copolymers and also when glass fibers, glass beads, mineral fillers, graphite fiber or graphite powder are coated with the polyetherimides, these can more readily be incorporated into a molded amide-imide-phthalamide object. Polyetherimides have also been found to aid the manufacture of amide-imide-phthalamide films having a thickness of about 0.5 to about 10 mils. Films without polyetherimides are so brittle that they cannot be prepared from amide-imide-phthalamide copolymers having a thickness of about 0.5 to about 10 mils without cracking and tearing.

Suitable polyetherimides comprise essentially chemically combined units of the formula:

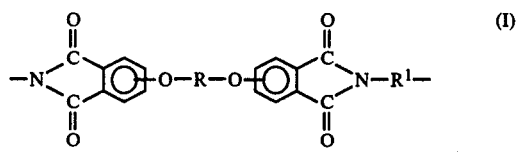

where R is a member selected from the class consisting of (a) the following divalent organic radicals:

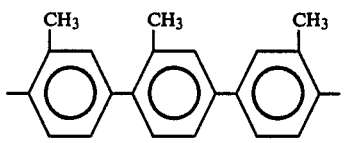

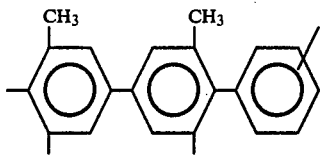

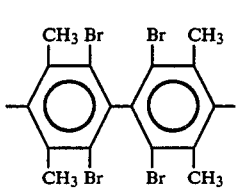

and

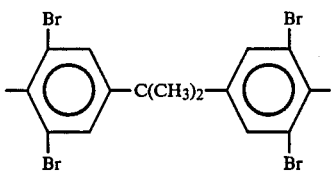

and (b) divalent organic radicals of the general formula:

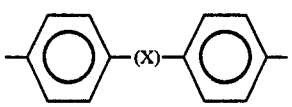

where X is $-C_yH_{2y}-$, y is a whole number equal to 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) C$_{(2-8)}$alkylene terminated polydiorganosiloxanes, and (d) divalent radicals included by the formula:

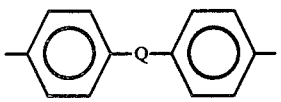

where Q is a member selected from the class consisting of:

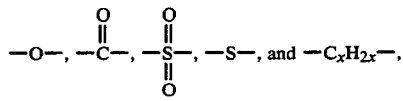

and x is a whole number equal to 1 to 5, inclusive.

We have unexpectedly discovered that blends of polyamide-imide-phthalamide copolymers and polyetherimides disclosed herein over a wide range can be made in which the properties of the blend show a marked average improvement over the properties of the components of these blends, and in some instances, the improvements in properties are unexpected, considering the proportion of either the polyamide-imide or the polyetherimide used. By making the above-described blends, the utility for both these members in the blend can be considerably expanded. In addition, by blending the polyamide-imide with polyetherimides, products can be obtained which are lower in cost than is usually associated with the use of the polyamide-imide alone without significant sacrifice, if any, in thermal properties.

The polyetherimides which are employed in the present invention can be made in accordance with the disclosures and teachings in U.S. Pat. No. 3,847,867 issued Nov. 12, 1974. The polyamide-imide employed in the practice of the instant invention can also be made in accordance with the disclosures and teachings in U.S. Pat. Nos. 4,313,868 and 4,309,528. By reference, these patents are made part of the disclosures and teachings of the instant application.

The amide-imide copolymers comprise recurring polyamide A units of:

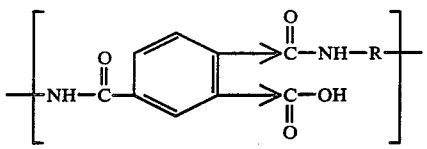

which are capable of undergoing imidization, and polyamide B units of:

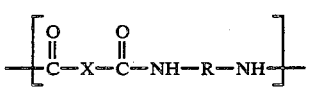

wherein the molar ratios of A units to B units is about 80 to 20 to 20 to 80, preferably 1 to 1 and wherein R is a divalent aromatic hydrocarbon radical of from about 6 to about 20 carbon atoms or two divalent hydrocarbons joined directly or by stable linkages selected from the group consisting of —O—, methylene, —CO—, —SO$_2$—, and wherein X is a divalent aromatic radical and → denotes isomerization.

In the injection molded form, the polyamide A units have converted to the polyamide-imide A' units and the copolymer comprises recurring polyamide-imide A' units of:

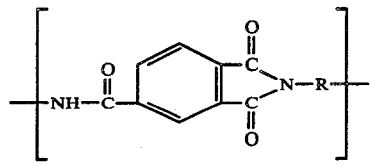

and polyamide B units of:

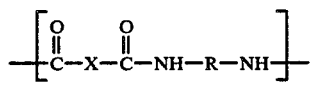

wherein the molar ratio of A' and B units is about 80 to 20 to about 20 to 80, preferably about 1 to 1 and wherein R and X are defined as above.

The copolymers of this invention are prepared from acyl halide derivatives of dicarboxylic acid such as isophthalic acid or terephthalic acid and an anhydride-containing substance and aromatic diamines. Useful acyl halide derivatives of dicarboxylic acid include:

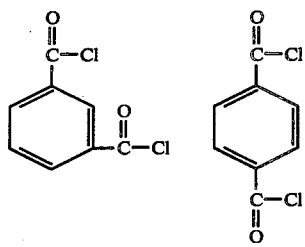

(II)

and related compounds. Suitably, the anhydride containing substance is an acyl halide derivative of the acid anhydride having a single benzene or lower acyl substituted benzene ring. The preferred anhydride is the four acid chloride of trimellitic anhydride (4 TMAC).

Useful aromatic diamines include para- and meta-phenylenediamine, oxybis (aniline), thiobis (aniline), sulfonylbis (aniline), diaminobenzophenone, methylenebis (aniline), benzidine, 1,5-diaminonaphthalene, oxybis(2-methylaniline), thiobis(2-methylaniline), and the like. Examples of other useful aromatic primary diamines are set out in U.S. Pat. No. 3,494,890 (1970), and U.S. Pat. No. 4,016,140 (1977) both incorporated herein by reference. The preferred diamine is meta-phenylenediamine.

The copolymers of this invention are prepared by reacting a mixture of an acyl halide derivative of an aromatic tricarboxylic acid anhydride and acyl halide derivatives of aromatic dicarboxylic acids with aromatic diamines.

A preferred class of polyetherimides which are included by formula (III) are polymers comprising of from about 2 to 5000 or more units and preferably from about 5 to about 100 units of the formula:

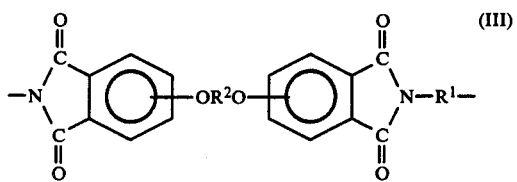 (III)

where $R^1$ is previously defined, and $R^2$ is:

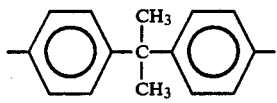

Included by the polyetherimides of formula III, are polymers comprising the following chemically combined units:

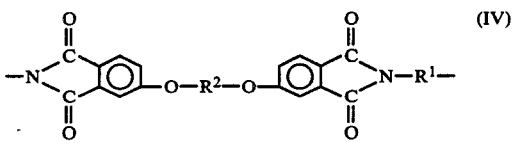 (IV)

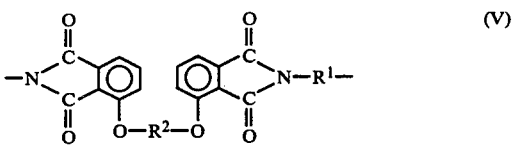 (V)

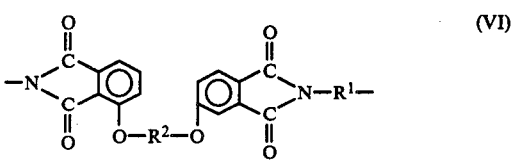 (VI)

and mixtures thereof, wherein $R^1$ and $R^2$ are defined above.

The polyetherimides of formulas III-VI can be made by effecting reaction between an aromatic bis(etheranhydride) of the general formula:

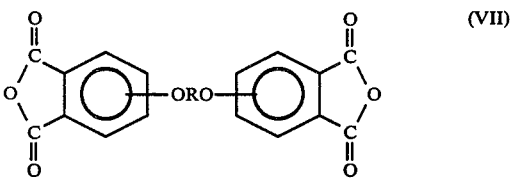 (VII)

and an organic diamine of the general formula $$H_2NR^1NH_2 \qquad (VIII)$$

where R and $R^1$ are as previously defined.

There can be employed from 0.95 to 1.05 mols of aromatic bis(etheranhydride) per mol of organic diamine.

In making the polyetherimides, there are employed from 0.95 to 1.05 mols of the aromatic dianhydride of formula VII per mol of the organic diamine of formula VIII. Preferably, one can employ equal or lower amounts of the bisanhydride and diamine.

The aromatic bis(etheranhydride) of formula VII shown in the above-mentioned U.S. Pat. No. 3,847,867, can be prepared from the hydrolysis followed by dehydration of the reaction product of the nitrosubstituted phenyl dinitrile and then continuing the reaction with a dialkali metal salt of a dihydric aryl compound in the presence of a dipolar aprotic solvent, where the alkali metal salt has the general formula $$Alk-O-R^1-O-Alk$$

where $R^1$ has the meanings given above and preferably is the same as $R^2$ and Alk is an alkali metal ion. Various well-known procedures can be used to convert the resulting tetranitriles to the corresponding tetracids and dianhydrides.

The amount of the polyetherimide added to the polyamide-imide-phthalamide copolymer can be about 0.1 to about 50 weight percent, usually in the range of about 10 to about 40 weight percent.

The addition of these polyetherimides increases the physical properties as follows:

TABLE I

| Sample | A | B | C | D | E |
|---|---|---|---|---|---|
| Polyamide-imide, % | 96.5 | 87 | 77.5 | 67.5 | 58 |
| Polyetherimide, % | — | 9.5 | 19 | 29 | 38.5 |
| $TiO_2$, % | 3.0 | 3.0 | 3.0 | 3.0 | 3.0 |
| PTFE, % | 0.5 | 0.5 | 0.5 | 0.5 | 0.5 |
| Blend Ratio PAI/PEI | 100/0 | 90/10 | 80/20 | 70/30 | 60/40 |
| Physical Properties | | | | | |
| Tensile Strength $\times 10^3$ PSI | | | | | |
| As-Molded | 3.0 | 6.8 | 5.3 | 7.8 | 9.7 |
| Cured @ 500° F. | — | 12.6 | 17.4 | 20.5 | — |
| Cured @ 515° F. | 16.6 | 23.8 | 22.8 | 21.6 | 19.8 |
| Tensile Elongation, % | | | | | |
| As-Molded | 1.4 | 2.6 | 1.8 | 2.3 | 4.6 |
| Cured @ 500° F. | — | 4.8 | 6.4 | 7.4 | — |
| Cured @ 515° F. | 5.8 | 8.2 | 9.2 | 10.0 | 9.3 |
| Flexural Modulus $\times 10^6$ PSI | | | | | |
| As-molded | 0.75 | 0.52 | 0.55 | 0.55 | 0.64 |
| Cured @ 500° F. | — | 0.64 | 0.63 | 0.61 | — |
| Cured @ 515° F. | 0.84 | 0.65 | 0.63 | 0.59 | 0.54 |
| Izod Impact, Notched ft-lbs/in | | | | | |
| As-Molded | * | 0.2 | 0.5 | 0.5 | 0.1 |
| Cured @ 500° F. | — | 0.9 | 0.8 | 1.4 | — |
| Cured @ 515° F. | 0.4 | 0.8 | 1.3 | 1.5 | 1.2 |
| Dart Impact, in-lbs Cured @ 515° F. | <2.0 | — | 22.6 | — | — |
| HDT, °F. | | | | | |
| As-Molded | 475 | 482 | 468 | 437 | 403 |
| Cured @ 500° F. | — | 540 | 539 | 526 | — |
| Cured @ 515° F. | 553 | 563 | 540 | 542 | — |

*Sample broke during notching (sample preparation)

TABLE II

| Sample | F | G | H | I |
|---|---|---|---|---|
| Polyamide-imide, % | 59 | 53 | 47 | 55 |
| Polyetherimide, % | — | 6 | 12 | 14 |
| Glass Fibers PPG 3540, % | 40 | 40 | 40 | — |
| Graphite Fibers AS1810, % | — | — | — | 30 |
| PTFE, % | 1 | 1 | 1 | 1 |
| Blend Ratio PAI/PEI | 100/0 | 90/10 | 80/20 | 80/20 |
| Physical Properties | | | | |
| Tensile Strength $\times 10^3$ PSI | | | | |
| As-Molded | 10.8 | 20.8 | 19.7 | 21.8 |
| Cured @ 500° F. | 29.0 | 33.3 | 32.7 | 38.0 |
| Tensile Elongation % | | | | |
| As-Molded | 2.0 | 3.2 | 3.0 | 6.2 |
| Cured @ 500° F. | 6.0 | 7.2 | 6.9 | 8.8 |
| Flexural Modulus $\times 10^6$ PSI | | | | |
| As-Molded | 2.1 | 2.0 | 2.0 | 2.59 |
| Cured @ 500° F. | 2.0 | 1.9 | 1.9 | 2.46 |

TABLE II-continued

| Sample | F | G | H | I |
|---|---|---|---|---|
| Flexural Strength × 10³ PSI | | | | |
| As-Molded | 25.2 | 35.6 | 31.9 | 31.7 |
| Cured @ 500° F. | 51.4 | 56.1 | 53.7 | 56.8 |
| Izod Impact, Notched ft-lbs/in | | | | |
| As-Molded | 1.0 | 1.6 | 1.5 | 0.9 |
| Cured @ 500° F. | 1.6 | 1.8 | 2.0 | 1.3 |
| Dart Impact, in-lbs | 4.5 | — | 10.5 | — |
| Cured @ 500° F. | | | | |
| HDT, °F. | | | | |
| As-Molded | 500 | 512 | 507 | 494 |
| Cured @ 500° F. | 550 | 555 | 552 | 550 |

Polyamide-imide-phthalamide polyetherimide copolymers build their properties during the annealing step such that molded properties are significantly below the annealed properties as shown in Table 3. To build polyamide-imide-phthalamide polyetherimide properties, parts are annealed at temperatures up to about 530° F. but preferably about 500° to about 520° F. It is important that the polyamide-imide-phthalamide Tg is maintained above the maximum annealing temperature such that optimum properties can be built during annealing. It is also important that the polyamide-imide-phthalamide Tg is above the maximum annealing temperatures so that part distortion due to stress relaxation does not occur.

TABLE III

| | As Molded | Annealed at 500° F. |
|---|---|---|
| Glass Loading, % | 40 | 40 |
| Injection Molding Temp., °F. | 650 | 650 |
| Physical Properties | | |
| Tensile Strength, psi | 10,800 | 29,000 |
| Tensile Elongation, % | 2.0 | 6.0 |
| Flexural Modulus, psi | 2,100,000 | 2,000,000 |
| HDT, °F. | 500 | 550 |
| Izod Impact, ft.-lbs./in. of notch | 1.0 | 1.6 |

After cure, a representative 20 percent polyetherimide neat polyamide-imide-phthalamide copolymer sample had total shrinkage of 10 mils per inch, while the control had a shrinkage of 8 mils per inch.

It should be particularly emphasized that when our polyamide-imide-phthalamide copolymers are blended with polyetherimides, an ideal two-phase system is formed giving two specific glass transition temperatures, one at about 270° C. and the other at about 215° C.

Polyamide-imide-phthalamide-polyetherimides coated on sized fillers such as glass fibers give better molding characteristics and improved as-molded properties. Thus polyamide-imide-phthalamide-polyetherimide copolymers, containing about 20 to about 60 percent fillers can be marketed without loss of the excellent cured thermal properties of our polyamide-imide-phthalamide copolymers.

Cavity pressure measurements are used as quality control checks of polyamide-imide-phthalamide-polyetherimide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressure process poorly and that spiral flow measurements were not sensitive enough to discriminate between resins in the viscosity range of interest. Low cavity pressures indicate a large pressure drop between injection and cavity pressures. This indicates higher resin viscosities. In the same manner high cavity pressures indicate less pressure change between injection and cavity pressures, suggesting lower resin viscosities.

Amide-imide polymer and copolymer viscosities had been measured by spiral flow determination previous to the implementation of the cavity pressure procedure, see U.S. Pat. No. 4,224,214. Cavity pressure was selected over spiral flow because of its greater sensitivity. The cavity pressure test has been implemented as an amide-imide homopolymer and copolymer quality control procedure. Like spiral flow, cavity pressure is a test that can be done conveniently in a molder's shop.

The injection molding machine was equipped with a horizontally mounted thermoset screw and barrel assembly. The mold was heated with hot oil from a Mokon Model 105-057 heating unit. Cavity pressure was recorded with a Control Process Model 241 recorder. The mold was equipped to handle pressure transducers at the ejector pins located at the gate end of the tensile bar and the gate end of the flex bar before beginning the work. Since it was desirable to make cavity pressure measurements at the dead end of the flex bar, it was necessary to make some modifications in the mold base to accommodate a transducer at this pin position.

Resins were dried in a desiccant hot air circulating oven at 300° F. for at least 16 hours before testing. Moisture in polyamide-imide-phthalamide-polyetherimide system has a very significant effect on the copolymers and their flow properties. Therefore, special care was taken to be sure the samples were properly dried. This drying procedure was used before making flow rate and cavity pressure measurements.

The flow rate procedure was patterned after the standard method described in ASTM D1238. A 335° C. (635° F.) barrel temperature with a 30 minute preheat time was used. This is about the largest set of weights that can be used safely with the standard extrusion plastometer apparatus. A standard 0.0825 in. diameter, and a 0.315 in. long orifice was used.

Special care was taken to be sure that each flow rate measurement was started when an equivalent volume of resin was in the barrel. Previous rheology work indicated that there is a very large "barrel height" effect on amide-imide copolymers. Each flow rate measurement was initiated while the top of the piston collar was between the two scribe marks on the piston. This precaution is also required by ASTM in method D1238.

Films having a thickness of about 0.5 to 10 mils have been produced from our polyamide-imide-phthalamide-polyetherimide resins. These films have properties as shown in Example 15.

The reinforced polyamide-imide-phthalamide-polyetherimide copolymers may be prepared in various ways. For example, so-called roving endless glass fiber strands are coated with the polyetherimide, disclosed herein, and then are further coated with the polyamic acid melt and subsequently chopped. The chopped fibers or the glass beads coated with polyetherimides may also be mixed with granulated polyamic acid and the resulting mixture melted in a conventional extruder, or alternatively the fibers coated with polyetherimides may be directly introduced into the polyamic acid melt through a suitable inlet in the extruder. Injection molding of the unfilled or glass-filled polyamide-imide-phthalamide-polyetherimide copolymers is accomplished by injecting the copolymers into a mold maintained at a temperature of about 350° F. to about 450° F. In this process, a 15 to 30 second cycle is used with a barrel temperature of about 580° F. to about 670° F. The injection molding conditions are given in Table IV.

properties despite the fact that they contain about 10 to about 40 weight percent of polyetherimides.

TABLE V

| | | | | | | | | |
|---|---|---|---|---|---|---|---|---|
| Polyamide-imide, % | 96.5 | 87 | 77.5 | 67.5 | 58 | 59 | 53 | 47 |
| Polyetherimide, % | 0 | 9.5 | 19 | 29 | 38.5 | — | 6 | 12 |
| TiO$_2$, % | 3.0 | 3.0 | 3.0 | 3.0 | 3.0 | — | — | — |
| PTFE, % | 0.5 | 0.5 | 0.5 | 0.5 | 0.5 | 1 | 1 | 1 |
| Glass Fibers PPG 3540, % | — | — | — | — | — | 40 | 40 | 40 |
| Blend Ratio | 100/0 | 90/10 | 80/20 | 70/30 | 60/40 | 100/0 | 90/10 | 80/20 |
| Tensile Strength × 10$^3$, PSI | 16.6 | 23.8 | 22.8 | 21.6 | 19.8 | 29.0 | 33.3 | 32.7 |
| Tensile Elongation, % | 5.8 | 8.2 | 9.2 | 10.0 | 9.3 | 6.0 | 7.2 | 6.9 |
| Flexural Strength × 10$^3$, PSI | — | 31.4 | 31.4 | 30.4 | 31.5 | 51.4 | 56.1 | 53.7 |
| Flexural Modulus × 10$^6$, PSI | 0.84 | 0.65 | 0.63 | 0.59 | 0.54 | 2.0 | 1.9 | 1.9 |
| Izod Impact, ft.-lbs./in. of notch | 0.4 | 0.8 | 1.3 | 1.5 | 1.2 | 1.6 | 1.8 | 2.0 |
| Dart Impact, in.-lbs. | <2.0 | — | 22.6 | — | — | 4.5 | — | 10.5 |
| HDT, °F. | 553 | 563 | 540 | 542 | — | 550 | 555 | 552 |
| Flexural Strength × 10$^3$, PSI @ 400° F. | 24.8 | — | — | 18.8 | — | 36.1 | 39.9 | 35.5 |
| Total Shrinkage, mils/in. | 8.0 | 10.0 | 10.0 | 10.0 | 17.5* | 1.0 | 1.0 | 1.0 |

Neat samples were cured @ 515° F.; the fiber filled samples cured @ 500° F.
*Sample distorted when cured @ 515° F.

TABLE IV

| | Set Points |
|---|---|
| Cylinder Temperatures, °F. | |
| Nozzle | 650–670 |
| Front Zone | 650–670 |
| Rear Zone | 640–660 |
| Timer, seconds | |
| Clamp Closed (cure) | 18 |
| Injection Hold | 6 |
| Booster (Inj. Hi) | 2 |
| Cycle Delay (open) | 1 |
| High-Low | 2 |
| Injection Pressure, psi | |
| High | 20,000 |
| Low | 10,000 |
| Machine Settings | |
| Clamp Pressure, tons | Max. |
| Injection Rate | Max. |
| Screw RPM | 50 |
| Feed Setting | As Req'd. |
| Cushion | ¼″ |
| Back Pressure, psi | 220 |
| Mold Temperature, °F. | |
| Stationary | 450 |
| Movable | 450 |
| Hopper Drier | 220 |

The mechanical properties of the unfilled amide-imide copolymers containing polyetherimides (melt compounded) and also the filled polyamide-imide-phthalamide polyetherimide copolymers are given in Table V and it shows that these copolymers have improved cured mechanical properties and excellent thermal All of the materials studied were molded on the 10 oz. Stokes injection molder under Table IV molding conditions unless specified otherwise. A 10 oz. Stokes injection molder is fitted with a 1:1 compression thermoset screw which can hold approximately 365 grams of the polyamide-imide-phthalamide-polyetherimide-copolymer (approximately 0.8 lbs). Since each test tree weighs approximately 23 grams (neat parts) only 1/16th of the complete injection stroke (shot volume) is used during the molding evaluation. Under these conditions (18 second clamp), the total time the copolymer is trapped in the barrel is approximately 7.2 minutes (total cycle is 27 seconds). This does not mean that the copolymer is in the melt state for the complete 7.2 minutes due to the temperature gradient (front to rear) in the barrel. For a complete material transition (purge) 16–20 shots must be taken before collecting data.

Polyamide-imide-phthalamide-polyetherimide copolymer flow, under molding conditions, is determined by its cavity pressure which is measured at a point farthest from the sprue. In this test, a pressure transducer is fitted behind a knockout point located behind the flex bar. The higher the cavity pressure, the better the flow thus making for easier mold filling. To determine our polyamide-imide-phthalamide-polyetherimide copolymer reactivity a plot of cavity pressure vs. cycle time is drawn. A stable or non-reactive resin will exhibit good flow characteristics under adverse molding conditions resulting in a melt insensitive to a change in cycle time. A reactive copolymer will be cycle time dependent in that its viscosity increases with cycle time. This is illustrated by a steep negative cavity pressure slope. Polyamide-imide-phthalamide-polyetherimide copolymer samples were all dried for approximately 16 hours at about 300° F. in a hot air circulating oven containing a suitable desiccant. Polyamide-imide-phthalamide-polyetherimides were dried overnight in a vacuum oven at 230° F. Samples were dry blended together and stored under vacuum in sealed containers.

Polyamide-imide-phthalamide-polyetherimide copolymer samples were cured in a Blue M hot air programmable oven under a 7-day cycle with 1 day at 320° F., 400° F., 450° F., 475° F. and 3 days at 500° F. Several tensile bars were cured under a 7-day cycle with 3 days at 515° F.

The following examples illustrate the preferred embodiment of the invention. It will be understood that the examples are for illustrative purposes only and do not purport to be wholly definitive with respect to conditions or scope of the invention.

EXAMPLE I

A 200 ml, round-bottom, 4-neck flask, equipped with a nitrogen inlet tube, stirrer, thermometer, and solids addition funnel, was charged with 99.9 parts by weight of (pbw) p,p'-oxybis(aniline) (OBA), 23.1 pbw meta-phenylenediamine (MPDA) and 604 pbw N-methylpyrrolidone (NMP). When solution at room temperature (72° F.) was complete, 142.5 pbw 4-trimellitoyl anhydride chloride (4-TMAC), having a percent purity of 99.5 percent ±0.5 percent as determined from chloride content and 6.8 pbw of trimellitic acid anhydride (TMA) was added over 2.5 hours while maintaining a solution temperature of between about 77°–95° F. When addition was complete, the solution was stirred for 3 hours during which time the solution viscosity increases to a Gardner-Holdt value of Z5+ or about 110 poises.

Solid polymer was obtained by first pouring the viscous solution into twice its volume of distilled water in a Waring blender and then filtering. The filtrate was washed with 5 increments of 3000 pbw each of distilled water to remove hydrogen chloride that had been generated during reaction.

The solid was dried under a vacuum of 20 inches of mercury for 24 hours at 122° F. The above material was heated for 2 hours in an oven set at 450° F. to give the final product.

EXAMPLE II

A 10-gal, glass-lined Pfaudler kettle equipped with a water-cooled jacket and nitrogen inlet was charged with 9.87 lbs of m-phenylenediamine, 0.35 lbs of trimelitic anhydride and 59.2 lbs of N-methylpyrrolidone. After solution had occurred under a nitrogen purge, an intimate blend of 9.52 lbs of 4-trimellitoyl anhydride chloride and 9.17 lbs of isophthaloyl dichloride was added over 2.5 hrs keeping the temperature below 35° C. The resulting viscous solution was brought to 50° C. When the Gardner viscosity had reached a Z3 viscosity the solution was precipitated by passage through a Fitzpatrick comminuting mill. The polymer product was washed five times with deionized water followed by air-drying on a filter for 3 days. The product was then brought to a solids content of 98.3 percent by heating in a forced air oven for 2 hrs at 470° F.

EXAMPLE III

Metaphenylenediamine (540 g) and acetic acid (900 ml) were placed in a five-liter, three-necked, round bottom flask, equipped with mechanical stirrer, pressure equalizing addition funnel and nitrogen sparge tube, and distillation head and condenser. The nitrogen sparge was set at 300 cc/min and 765 g of acetic anhydride were added over 5 min. This was followed by the addition of 415 g of isophthalic acid and 480 g of trimelitic anhydride. The temperature of the bottom half of the spherical heating mantle surrounding the flask was set at 700° F. and the top half of the mantle was heated with a Variac set at 50. After 105 min., 1730 ml of distillate were collected and the polymer had become very viscous. The heat was turned off and the polymer was cooled under nitrogen.

EXAMPLE IV

A 690 gram portion of dimethylacetamide was stirred and cooled to 5° C. with dry nitrogen purging to keep the system dry. An intimate mixture composed of 252.2 grams of 4-TMAC, 119.0 grams of p',p-methylene-bis-(aniline), and 120.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC were then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained.

EXAMPLE V

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP were added to wash in all solids, then the reaction mixture was heated to 50° C. and held at that temperature for 3½ hours. The solution was then filtered.

EXAMPLE VI

The general procedure for preparing a copolymer containing three diamines is illustrated by the reaction of OBA, MPDA, MBA and 4-TMAC in DMAC. Thus, a 242.0 gram portion of OBA (1.21 moles), a 130.7 gram portion of MPDA (1.21 moles) and a 239.6 gram portion of MBA (1.21 moles) were dissolved in 3,900 grams DMAC contained in a 6-liter flask, equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min) to 50° C. The reaction solution was stirred at 50° C. for 90 minutes and then the solution was precipitated by admixing with water. Prior to precipitation, the solution viscosity was about 7.5 stokes (25° C., 20 percent solids). The polymer was precipitated in distilled water in a model D, W. J. Fitzpatrick Company, comminuting machine (Fitz mill). After precipitation, the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°–35° C. for 12–15 hours.

EXAMPLE VII

A 78 gram amount of the copolymer in powdered form made according to the procedure set forth in Example I was heated at 550° F. for about 1 hour. It was then cooled and charged cold into a mold preheated in the press to about 600° F. to about 650° F. A maximum pressure of 4,200 psi was applied over a 25 minute period and thereafter the mold and contents cooled to 500° F. under a pressure of 2,100 psi and the molded item immediately ejected. A disk measuring 5½ inches in diameter and ⅛ inch thick had been formed.

EXAMPLE VIII

A 10-gal, glass-lined Pfaudler kettle equipped with a water-cooled jacket and nitrogen inlet was charged with 9.87 lbs of m-phenylenediamine, 0.35 lbs of trimellitic anhydride and 59.2 lbs of N-methylpyrrolidone. After solution had occurred under a nitrogen purge, an intimate blend of 9.52 lbs of 4-trimellitoyl anhydride chloride and 9.17 lbs of isophthaloyl dichloride was added over 2.5 hrs keeping the temperature below 35° C. The resulting viscous solution was brought to 50° C. When the Gardner viscosity had reached a Z1 viscosity the solution was precipitated by passage through a Fitzpatrick comminuting mill. The polymer product was washed five times with deionized water followed by air-drying on a filter for 3 days. The product was then brought to a solids content of >98% by heating in a forced air oven for 2 hrs at 470° F.

EXAMPLE IX

A round-bottom, 2000-ml, 4-necked flask was charged with 1045 g dry N-methylpyrrolidone (NMP), 16.2 g (1.5 mol) m-phenylenediamine (MPDA), and 4.3 g trimellitic anhydride (TMA) (0.0225 mol). The flask was equipped with a mechanical stirrer, nitrogen inlet tube, thermometer, and a liquid addition funnel. During solution of the diamine and TMA, the addition funnel was charged with 248.0 g (1.178 mol) 4-trimellitoyl anhydride chloride (4-TMAC) and 60.9 g (0.30 mol) isophthaloyl dichloride (IPCl$_2$) and melted at 80° C. When melting was complete, the solution of acid chlorides was added to the diamine/TMA solution over a 2-hour period at 25°-35° C. After addition was complete the viscous solution was heated to 50° C. and held for 1 hour.

EXAMPLE X

A polyamide-imide-phthalamide copolymer was dry blended with various amounts of a polyetherimide and then the blend was melt homogenized in a Brabender mixing head for 6 minutes at a mixing speed of 47 rpm. The stock temperature was set at 340° C. and torque and melt temperature was measured after 6 minutes of mixing. Table VI summarizes the preparation conditions. Note that a steady decrease in torque and melt temperature occurs with increasing concentrations of polyetherimide up to ca. 60%. At higher polyetherimide concentrations, both torque and melt temperature remain relatively constant, the latter at the stock temperature of 340° C. An apparent maximum in torque temperature occurs at the 90/10 polyamide-imide-phthalamide copolymer/polyethersulfone composition and cannot be explained.

Glass transition temperatures and ΔCp's were determined on the Omnitherm QC25 thermal analyzer. The calibration of the instrument was checked periodically over the time span that the samples were run. Five such calibration checks yielded an estimated precision of ±1° C. in Tg's and ±3% in the ΔCp's.

TABLE VI

Polyamide-Imide-Phthalamide Copolymer/Polyetherimide Blends: Preparation Conditions Using Brabender Mixing Head

| Blend Composition PAI/PEI | Melt Temperature, °C. | Torque, Newton-Meter |
|---|---|---|
| 100/0 | 352 | 36 |
| 95/5 | 354 | 44 |
| 90/10 | 354 | 54 |
| 80/20 | 350 | 40 |
| 70/30 | 344 | 33 |
| 60/40 | 345 | 25 |
| 50/50 | 345 | 24 |
| 40/60 | 342 | 18 |
| 30/70 | 341 | 17 |
| 20/80 | 341 | 16 |
| 10/90 | 340 | 17 |
| 0/100 | 340 | 15 |

Stock Temperature = 340° C.
Mixing Speed = 47 RPM

TABLE VII

Polyamide-Imide-Phthalamide Copolymer/Polyetherimide Blends-Thermal Results

| | Tg, °C. | | ΔCp, Cal/gm Deg. | |
|---|---|---|---|---|
| % PEI | PEI | PAI | PEI | PAI |
| 0 | — | 273 | — | .0931 |
| 5 | N.D. | 274 | N.D. | .0879 |
| 10 | 209 | 274 | .0037 | .0849 |
| 20 | 209 | 275 | .01095 | .0734 |
| 30 | 212 | 275 | .01995 | .0675 |
| 40 | 214 | 278 | .0252 | .0524 |
| 50 | 216 | 279 | .0309 | .0454 |
| 60 | 215 | 280 | .0367 | .0358 |
| 70 | 215 | 282 | .0469 | .0225 |
| 80 | 216 | 284 | .0479 | .0144 |
| 90 | 215 | 289 | .0591 | .0047 |
| 100 | 217 | — | .0606 | — |

N.D.: Present, but too small to measure.

TABLE VIII

Comparison of Melt-Prepared and Solution-Prepared Thermal Properties

| | Tg PEI, °C. | | Tg PAI, °C. | |
|---|---|---|---|---|
| % PEI | Melt | Soln | Melt | Soln |
| 0 | — | — | 273 | 285 |
| 30 | 212 | 210 | 276 | 275 |
| 50 | 216 | 215 | 279 | 280 |
| 70 | 215 | 216 | 282 | 278 |
| 90 | 215 | 218 | 289 | 273 |
| 100 | 217 | 217 | — | — |

PEI: Polyetherimide - Ultem 1000
PAI: Polyamide-imide-phthalamide copolymer prepared as shown in Example VIII.

The above results indicate that the polyamide-imide-phthalamide copolymers are not miscible with the polyetherimide since two distinct glass transition (Tg) temperatures were observed, one Tg for each component. Solution blends of the polyamide-imide-phthalamide copolymers with polyetherimide were prepared in N-methyl-2-pyrrolidone at ca. 80°–100° C. The samples were then precipitated out, using H$_2$O, washed, filtered and dried at 150° C. for several days under vacuum. Similar results were obtained where a two-phase, non-miscible blend was observed (more than one blend Tg). These solution and melt blends of a polyamide-imide-phthalamide copolymer polyetherimide form an ideal two-phase system while those reported in U.S. Pat. No.

4,258,155 where a single-phase system was observed do not.

EXAMPLE XI

Neat polyamide-imide-phthalamide copolymer polyetherimide blends can be prepared by physically blending the constituents together, either pellet to pellet, powder to powder, powder to pellet, or pellet to powder with or without a compounding step prior to injection molding or film extruding. It is preferred that the constituents are melt compounded, especially via a twin screw extruder.

The filled polyamide-imide-phthalamide copolymer polyetherimide blends can be prepared as described above or the polyetherimide can be dissolved in a solvent and spray coated or dip coated on the filler and/or reinforcement (graphite fibers, glass fibers, and mineral fillers).

EXAMPLE XII

When polyamide-imide-phthalamide copolymers are fiber filled and then injection molded into parts that have cross-sections greater than 250 mils, internal part cracking becomes a problem. It is believed that the low as-molded (prior to curing) strength and toughness of the polyamide-imide-phthalamide copolymers cannot resist the cool down stresses during molding resulting in parts which have internal cracks. Thus the parts are not commercially useable. I have found that by alloying (blending) up to 50 percent by polymer weight of polyetherimide with the polyamide-imide-phthalamide copolymers that as-molded strength and toughness properties are substantially improved and that thicker wall parts can be molded crack-free. The preferred blending ratio is 80/20 polyamide-imide-phthalamide copolymer/polyetherimide. These alloys can be cured to temperatures up to 500° F., and during the curing step the alloy increases its mechanical and thermal properties.

| Polyamide-Imide-Phthalamide Copolymer | | | |
|---|---|---|---|
| Polyetherimide, % | 0 | 10 | 20 |
| Glass Fibers PPG 3540, % | 40 | 40 | 40 |
| As-Molded Properties | | | |
| Tensile Strength, psi | 10,800 | 20,800 | 19,700 |
| Tensile Elongation, % | 2.0 | 3.2 | 3.0 |
| Izod Impact, $\frac{\text{ft.-lbs.}}{\text{in. of notch}}$ | 1.0 | 1.6 | 1.5 |
| Molding Thickness (% Crack-Free Parts) | | | |
| 4" × 0.5" Disk | 0 | 10 | 90 |
| 5.5" × 0.43" Disk | 0 | — | 95 |
| Cured Properties* | | | |
| Tensile Strength, psi | 29,000 | 33,300 | 32,700 |
| Tensile Elongation, % | 6.0 | 7.2 | 6.9 |
| Izod Impact, $\frac{\text{ft.-lbs.}}{\text{in. of notch}}$ | 1.6 | 1.8 | 2.0 |
| Dart Impact, in.-lbs. | 4.5 | — | 10.5 |
| HDT, °F. | 550 | 555 | 552 |

*Samples cured @ 500° F.

EXAMPLE XIII

With successful alloys, the property profile is either additive or synergistic, whereas with incompatible (undesirable) blend systems, the observed properties are lower than either polymer component. An ideal alloy would be one whose property profile is synergistic where the alloy exhibits properties superior to either polymer component.

The polyamide-imide-phthalamide polyetherimide copolymer blends are ideal two-phase systems since they exhibit a synergistic strength profile trend where the tensile strengths of the alloy are greater than either of its polymer blend components. For example, the tensile strength of polyetherimide and polyamide-imide-phthalamide copolymers are less than 17,000 psi while the 90/10, 80/20, 70/30 and 60/40 blends of the polyamide-imide-phthalamide/polyetherimide have tensile strengths of 23,800 psi, 22,800 psi, 21,600 psi and 19,800 psi, respectively.

This synergistic property profile trend is novel to the polyamide-imide-phthalamide/polyetherimide blends and different from other polyamide-imides that are blended with polyetherimide. These other polyamide-imide/polyetherimide blends have tensile strengths which lie between the polyamide-imide and the polyetherimide and can be estimated by the laws of mixtures.

This difference is property response between the polyamide-imides alloyed with polyetherimide illustrates that not all amide-imides behave the same when blended with the same secondary polymer components.

EXAMPLE XIV

Neat polyamide-imide-phthalamide copolymer parts are extremely brittle and tend to crak or shatter during the ejection sequence of an injection molding run. This problem of cracking and shattering is reduced when the neat polyamide-imide-phthalamide copolymers are alloyed with polyetherimide. These alloys have improved strength and toughness allowing the alloy to withstand the ejection force of the knockout pins. The neat polyamide-imide-phthalamide copolymers have good flow properties at temperatures at and above 650° F. and at ejection molding shear conditions. These polyamide-imide-phthalamide copolymers are thus alloyed to build properties and to improve the crack resistance of the copolymer.

EXAMPLE XV

Polyamide-imide-phthalamide polyetherimide copolymer films can be fabricated on a single or twin screw extruder that have thickness in the 0.5 to 10 mil range. These copolymer alloys can also be extruded into thicker extrudates such as ribbons and sheets. An 80/20 polyamide-imide-phthalamide copolymer/polyetherimide blend film was extruded on a Werner Pfleider ZSK-30 twin screw extruder and films from 1.0 to 10 mils were collected. This polyamide-imide-phthalamide alloy has good melt ductility characteristics allowing the hot melt to be drawn into a thin film. To illustrate the drawability of the alloy, samples were collected at take-off speeds as high as 70 ft/min (machine limit) resulting in a highly oriented 1.5 mil film. The uncured films were resilient and could be creased in the transverse direction without tearing or shattering. The films were also translucent and cherry red in color and did not delaminate. Each of the films were cured at 515° F. without stress relaxing and micro-tensile tiers were die cut without any difficulty. See the table below for film properties.

| 80/20 Polyamide-Imide-Phthalamide Copolymer Polyetherimide Blend | | | | |
|---|---|---|---|---|
| Film Thickness, mil | 1 | 2 | 4 | 5 |

-continued

80/20 Polyamide-Imide-Phthalamide Copolymer Polyetherimide Blend

| Physical Properties | | | | |
|---|---|---|---|---|
| Yield Tensile Strength, psi | | | | |
| MD | 19,800 | 16,420 | 17,690 | None |
| TD | 18,940 | None | None | 18,800 |
| Break Tensile Strength, psi | | | | |
| MD | 19,500 | 15,370 | 16,530 | 19,540 |
| TD | 18,700 | 13,820 | 15,540 | 18,390 |
| Yield Tensile Elongation, % | | | | |
| MD | 9.8 | 9.8 | 9.7 | None |
| TD | 9.2 | None | None | 7.6 |
| Break Tensile Elongation, % | | | | |
| MD | 14.4 | 15.1 | 12.1 | 10.1 |
| TD | 13.2 | 7.8 | 6.8 | 9.6 |
| Tensile Modulus, psi | | | | |
| MD | 411,900 | 345,200 | 400,800 | 425,900 |
| TD | 402,500 | 388,200 | 411,000 | 468,400 |

I claim:

1. As a composition of matter, a blend of a polyetherimide and an amide-imide-phthalamide copolymer comprising as a first component about 10 to about 40 percent by weight of said polyetherimide moiety and as a second component about 90 to about 60 percent by weight of said amide-imide-phthalamide copolymer comprising recurring polyamide A units of:

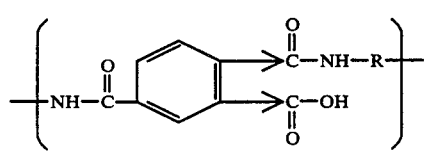

which are capable of undergoing imidization, and polyamide B units of:

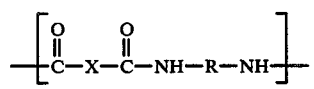

wherein the molar ratio of A units to B units is about 1 to 1, wherein R is a divalent aromatic hydrocarbon radical and wherein X is a divalent aromatic radical and → denotes isomerization.

2. The amide-imide-phthalamide copolymer of claim 1 wherein R is a divalent hydrocarbon radical of from about 6 to about 20 carbon atoms or two divalent hydrocarbons joined directly or by stable linkages selected from the group consisting of —O—, methylene, —CO—, —SO$_2$—.

3. The amide-imide-phthalamide copolymer of claim 1 wherein X is:

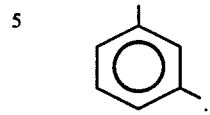

4. The amide-imide-phthalamide copolymer of claim 1 wherein X is:

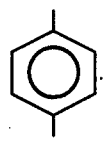

5. The composition of claim 1 wherein said polyetherimide is of the following formula:

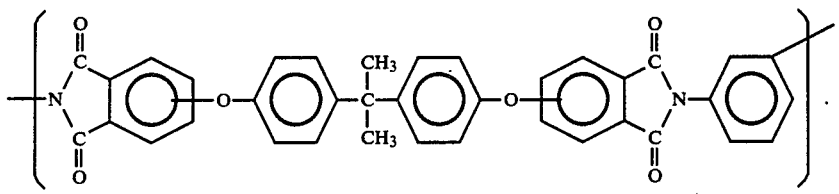

6. The amide-imide-phthalamide copolymer of claim 1 wherein X is

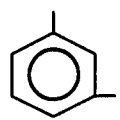

and R is

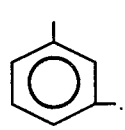

7. As a composition of matter, a blend of a polyetherimide and an amide-imide-phthalamide copolymer comprising as a first component about 10 to about 40 percent by weight of said polyetherimide moiety and as a second component about 90 to about 60 percent by weight of said amide-imide-phthalamide copolymer comprising recurring polyamide-imide A' units of:

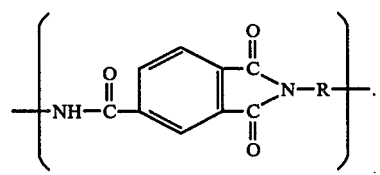

and polyamide B units of:

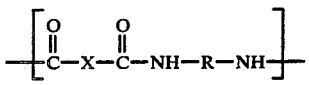

wherein the molar ratio of A' units to B units is about 1 to 1, wherein R is a divalent aromatic hydrocarbon radical and wherein X is a divalent aromatic radical.

8. The amide-imide-phthalamide copolymer of claim 7 wherein R is a divalent aromatic hydrocarbon radical of from about 6 to about 20 carbon atoms or two divalent hydrocarbons joined directly or by stable linkages selected from the group consisting of —O—, methylene, —CO—, —SO$_2$—.

9. The amide-imide-phthalamide copolymer of claim 7 wherein X is:

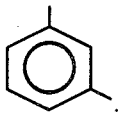

10. The amide-imide-phthalamide copolymer of claim 7 wherein X is:

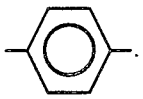

11. The composition of claim 7 wherein said polyetherimide is of the following formula:

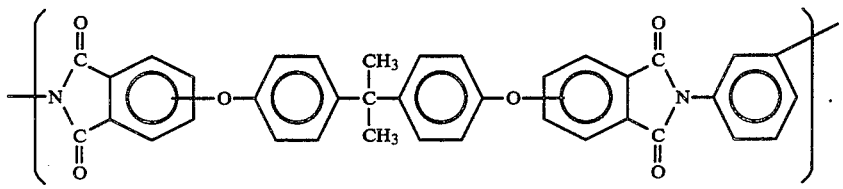

12. The amide-imide-phthalamide copolymer of claim 7 wherein X is

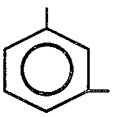

and R is

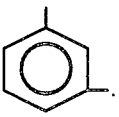

13. A process to improve the as-molded strength and toughness properties of the amide-imide-phthalamide copolymer of claim 12 which process comprises the blending in of about 10 to about 40 weight percent of polyetherimide into the copolymer.

14. A process to improve the thick wall molding performance of a neat and filled amide-imide-phthalamide copolymer of claim 12 which enables thick and crack-free wall parts to be molded which process comprises the blending in of about 10 to about 40 weight percent of polyetherimide into the copolymer.

15. The amide-imide-phthalamide copolymer of claim 12 in the form of a film having a thickness of about 0.5 to about 10 microns.

16. The composition of claim 7 containing about 10 to about 80 percent by weight of a filler selected from the group consisting of glass fibers, glass beads or graphite fibers.

17. The molded composition of claim 7.

18. The molded composition of claim 11.

19. A filled, moldable blend of a polyetherimide and an amide-imide-phthalamide copolymer comprising as a first component about 10 to about 40 percent by weight of said polyetherimide moiety and as a second component about 90 to about 60 percent by weight of said amide-imide-phthalamide copolymer comprising recurring polyamide-imide A' units of:

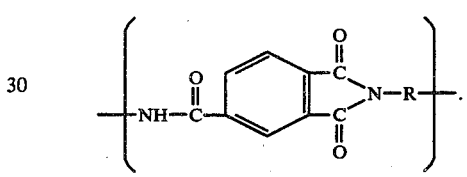

and polyamide B units of:

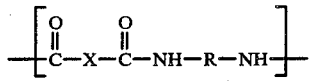

wherein the molar ratio of A' units to B units is about 1 to 1, wherein R is a divalent aromatic hydrocarbon radical, wherein X is a divalent aromatic radical and wherein about 10 to about 80 percent by weight of a filler coated with said polyetherimide is added to said blend and said filler is selected from the group consisting of glass fibers, glass beads and graphite fibers.

20. The resinous blend of claim 1 wherein said blend has a first glass transition temperature of about 205° C. to about 215° C. and a second glass transition temperature of about 270° C. to about 280° C.

* * * * *

UNITED STATES PATENT OFFICE
CERTIFICATE OF CORRECTION

Patent No. 4,640,944              Dated February 3, 1987

Inventor(s) Gary T. Brooks

It is certified that error appears in the above-identified patent and that said Letters Patent are hereby corrected as shown below:

| Patent Column | Line | |
|---|---|---|
| 20 | 12 | reads "microns" and should read --mils-- |

Signed and Sealed this

Thirty-first Day of January, 1989

Attest:

DONALD J. QUIGG

*Attesting Officer*          *Commissioner of Patents and Trademarks*